(12) United States Patent
Jin et al.

(10) Patent No.: US 9,982,774 B1
(45) Date of Patent: May 29, 2018

(54) HYDRAULIC CONTROL SYSTEM FOR AN AUTOMATIC TRANSMISSION

(71) Applicant: GM GLOBAL TECHNOLOGY OPERATIONS LLC, Detroit, MI (US)

(72) Inventors: Timothy Z Jin, Pleasant Ridge, MI (US); Chinar S Ghike, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 15/460,276

(22) Filed: Mar. 16, 2017

(51) Int. Cl.
F16H 61/02 (2006.01)
F16H 61/00 (2006.01)
F16H 57/04 (2010.01)

(52) U.S. Cl.
CPC ..... *F16H 61/0206* (2013.01); *F16H 57/0446* (2013.01); *F16H 61/0021* (2013.01); *F16H 61/0286* (2013.01); *F16H 2061/0037* (2013.01); *F16H 2200/0069* (2013.01)

(58) Field of Classification Search
None
See application file for complete search history.

(56) References Cited

U.S. PATENT DOCUMENTS

| | | | |
|---|---|---|---|
| 6,432,015 B1 * | 8/2002 | Takahashi | F16H 61/0206 475/116 |
| 6,585,617 B1 * | 7/2003 | Moorman | F16H 61/0206 475/119 |
| 6,865,965 B2 * | 3/2005 | Uchino | F16H 61/12 477/906 |
| 8,182,397 B2 * | 5/2012 | Shimizu | F16H 61/0206 475/119 |
| 8,210,976 B2 * | 7/2012 | Xie | F16H 61/0206 475/116 |
| 8,435,148 B2 * | 5/2013 | Moorman | F16D 48/0206 475/116 |
| 8,932,167 B2 * | 1/2015 | Berger | F16H 59/045 475/127 |

OTHER PUBLICATIONS

US Application filed Mar. 6, 2017; U.S. Appl. No. 15/450,704; Applicant: GM Global Technology Operations LLC; Title: Hydraulic Control System for an Automatic Transmission with a Manual Valve and Default to Gear.
US Application filed Jun. 30, 2016; U.S. Appl. No. 15/199,141; Applicant: GM Global Technology Operations LLC; Title: Hydraulic Control System for an Automatic Transmission With Electronic Transmission Range Selection.

\* cited by examiner

*Primary Examiner* — Dirk Wright

(57) ABSTRACT

A hydraulic control system for a motor vehicle transmission includes a pressure regulation subsystem and a manual valve assembly in fluid communication with the pressure regulation subsystem. The manual valve assembly is moveable between at least park, neutral, drive, and reverse positions. A default disable valve assembly is in fluid communication with the manual valve assembly, a default disable solenoid valve assembly, and a default select valve assembly. A one-way valve may be provided to permit hydraulic fluid to flow to a second-priority hydraulic circuit when in a default mode of operation. A combined main regulation and priority valve may be provided to pressurize line pressure as a first priority, pressurize the second-priority hydraulic circuit as a second priority, and to feed excess pressure to a decrease-pressure circuit as a third priority.

20 Claims, 9 Drawing Sheets

HYDRAULIC CONTROL SYSTEM FOR AN AUTOMATIC TRANSMISSION

This disclosure relates to a hydraulic control system for an automatic transmission, and more particularly to a hydraulic control system for an automatic transmission having a manual valve and two forward and one reverse default gear states.

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need exists for new and improved hydraulic control system configurations within transmissions which exhibit improved performance, especially during default conditions. A default condition is a hydraulic state that the transmission experiences in the absence of electronic control. A transmission in default no longer has the capability to electronically command solenoids to achieve the desired gear state. The default condition may have been intentionally commanded (e.g. when diagnostics indicate corrupt solenoid drivers, corrupt controllers, controller shutdown at high temperatures) or can occur unintentionally due to a hardware failure (e.g. controller failure, wiring harness failure, solenoid driver failure). For some transmission configurations, the hydraulic control system shifts the transmission to neutral during a default condition. Accordingly, there is a need for an improved, cost-effective hydraulic control system for use in a hydraulically actuated automatic transmission that provides forward and reverse driving states during default conditions.

SUMMARY

In one form, which may be combined with or separate from other forms disclosed herein, a hydraulic control system for a transmission of a motor vehicle is provided. The hydraulic control system includes a pressure regulation subsystem in fluid communication with a pump, the pressure regulation subsystem being configured to provide pressurized hydraulic fluid. A second-priority hydraulic circuit is in fluid communication with the pressure regulation subsystem. The second-priority hydraulic circuit includes one or more of: a cooling hydraulic subsystem, a lubrication hydraulic subsystem, and a torque converter control subsystem. A manual valve assembly is in fluid communication with the pressure regulation subsystem. The manual valve assembly is moveable between at least a park position, a neutral position, a drive position, and a reverse position. A default disable valve assembly is in fluid communication with the manual valve assembly. A default disable solenoid valve assembly is in fluid communication with the default disable valve assembly. The default disable solenoid valve assembly is configured to enable the default disable valve assembly to enable a plurality of default modes of operation. A default select valve assembly is in fluid communication with the default disable valve assembly. The default select valve assembly is configured to select between at least a portion of the plurality of default modes of operation. A blow-off valve is in fluid communication with the default select valve assembly, and the blow-off valve is configured to limit line pressure during the plurality of default modes of operation. A one-way valve is configured to permit a portion of the pressurized hydraulic fluid to flow to the second-priority hydraulic circuit when the hydraulic control system is in a default mode of operation.

In another form, which may be combined with or separate from the other forms disclosed herein, a hydraulic control system for a transmission of a motor vehicle is provided. The hydraulic control system includes a pressure regulation subsystem in fluid communication with a pump. The pressure regulation subsystem includes a combined main regulation and priority valve configured to provide pressurized hydraulic fluid. A second-priority hydraulic circuit is in fluid communication with the pressure regulation subsystem. The second-priority hydraulic circuit includes at least one of the following: a cooling hydraulic subsystem, a lubrication hydraulic subsystem, and a torque converter control subsystem. The combined main regulation and priority valve is configured to pressurize line pressure in the hydraulic control system as a first priority, to pressurize the second-priority hydraulic circuit as a second priority, and to feed excess pressure to a decrease-pressure circuit as a third priority. A manual valve assembly is in fluid communication with the pressure regulation subsystem. The manual valve assembly is moveable between at least a park position, a neutral position, a drive position, and a reverse position. A default disable valve assembly is in fluid communication with the manual valve assembly. A default disable solenoid valve assembly is in fluid communication with the default disable valve assembly. The default disable solenoid valve assembly is configured to enable the default disable valve assembly to enable a plurality of default modes of operation. A default select valve assembly is in fluid communication with the default disable valve assembly. The default select valve assembly is configured to select between at least a portion of the plurality of default modes of operation. A plurality of clutch regulation valve assemblies is in fluid communication with the pressure regulation subsystem, the manual valve assembly, the default disable valve assembly, and the default select valve assembly. The plurality of clutch regulation valve assemblies is configured to engage a plurality of torque-transmitting mechanisms.

Additional features may be optionally provided, including but not limited to the following: wherein the pressure regulation subsystem comprises a combined main regulation and priority valve; the combined main regulation and priority valve being configured to pressurize line pressure in the hydraulic control system as a first priority, to pressurize the second-priority hydraulic circuit as a second priority, and to feed excess pressure to a decrease-pressure circuit as a third priority; the hydraulic control system further comprising a plurality of clutch regulation valve assemblies in fluid communication with the pressure regulation subsystem, the manual valve assembly, the default disable valve assembly, and the default select valve assembly; wherein the plurality of clutch regulation valve assemblies is configured to engage a plurality of torque-transmitting mechanisms; wherein each of the plurality of clutch regulation valve assemblies includes an exhaust port configured to exhaust a torque-transmitting mechanism of the plurality of torque-transmitting mechanisms in a normal mode of operation; wherein each of the exhaust ports is in selective communication with the default disable valve assembly and the default select valve assembly; each exhaust port being configured to selectively receive pressurized hydraulic fluid in at least one default mode of the plurality of default modes of operation; wherein each exhaust port of each clutch regulation valve assembly of the plurality of clutch regulation valve assemblies selectively communicates with at least one of the default disable valve assembly and the default select valve assembly via at least one three-way valve of a plurality of three-way valves, where the three-way valves may be three-way ball check valves; wherein the default disable valve assembly is configured to selectively communicate pressurized hydraulic fluid from the manual valve assembly to the default select valve assembly when in the drive position; and the default select valve assembly being configured to selectively communicate pressurized hydraulic fluid to a first subset of the plurality of clutch regulation valve assemblies to provide a low default gear ratio and to a second subset of the plurality of clutch regulation valve assemblies to provide a high default gear ratio, the high default gear ratio having a higher gear speed than the low default gear ratio.

Further additional features may be provided, including but not limited to the following: wherein the default disable valve assembly is configured to selectively communicate pressurized hydraulic fluid from the manual valve assembly to the plurality of three-way valves to provide a reverse default gear ratio; wherein a position of the default select valve assembly is configured to be controlled by pressurized hydraulic fluid from the manual valve assembly and a spring when engaged in the high default gear ratio, from at least one of the clutch regulation valve assemblies of the plurality of clutch regulation valve assemblies and the spring when engaged in the low default gear ratio, and from the manual valve assembly and at least one of the clutch regulation valve assemblies of the plurality of clutch regulation valve assemblies when engaged in the reverse default gear ratio; wherein the plurality of torque-transmitting mechanisms includes six torque-transmitting mechanisms selectively engageable in combinations of four to provide at least 10 forward speed ratios and one reverse speed ratio; the second-priority hydraulic circuit comprising the torque converter control subsystem; and the hydraulic control system being free of an anti-backflow valve in fluid communication with the combined main regulation and priority valve.

Even further additional features may be provided, including but not limited to the following: the manual valve assembly being configured to selectively provide a drive fluid signal and a reverse fluid signal from the pressurized hydraulic fluid; the default disable valve assembly being configured to receive the drive fluid signal and the reverse fluid signal; the default disable solenoid valve assembly being configured to selectively engage the default disable valve assembly through an ON signal and an OFF signal; the default disable valve assembly having a first position configured to terminate the drive fluid signal and the reverse fluid signal when the default disable valve assembly receives the ON signal from the default disable solenoid valve assembly; the default disable valve assembly having a second position configured to communicate the drive fluid signal and the reverse fluid signal to a drive default fluid signal and a reverse default fluid signal when the default disable valve assembly receives the OFF signal from the default disable solenoid valve assembly; the default select valve assembly configured to receive the drive default fluid signal; the default select valve assembly having a first position configured to communicate the drive default fluid signal to a first exhaust signal and a second position configured to communicate the drive default fluid signal to a second exhaust signal; the plurality of clutch regulation valve assemblies being selectively in fluid communication with the first exhaust signal, the second exhaust signal, the drive default signal, and the reverse default signal; the plurality of default modes of operation including a low forward default gear ratio, a high forward default gear ratio, and a reverse default gear ratio; the default select valve assembly being configured to select between the low forward default gear ratio and the high forward default gear ratio.

Additional features may be provided, including but not limited to the following: in the low forward default gear ratio, the first exhaust signal communicates with the exhaust port of a first clutch regulation valve assembly and the exhaust port of a second clutch regulation valve assembly of the plurality of clutch regulation valve assemblies via a first three-way valve of the plurality of three-way valves, and the drive default signal communicates with the exhaust port of a third clutch regulation valve assembly and the exhaust port of a fourth clutch regulation valve assembly of the plurality of clutch regulation valve assemblies via a second three-way valve of the plurality of three-way valves; in the high forward default gear ratio, the second exhaust signal communicates with the exhaust port of a fifth clutch regulation valve assembly and the exhaust port of a sixth clutch regulation valve assembly of the plurality of clutch regulation valve assemblies via a third three-way valve of the plurality of three-way valves, and the drive default signal communicates with the exhaust port of the third clutch regulation valve assembly and the exhaust port of the sixth clutch regulation valve assembly via the second three-way valve; in the reverse default gear ratio, the reverse default signal communicates with the exhaust port of the first clutch regulation valve assembly and the exhaust port of the second clutch regulation valve assembly via the first three-way valve, the reverse default signal communicates with the exhaust port of the fourth clutch regulation valve assembly via the second three-way valve, and the reverse default signal communicates with the exhaust port of the sixth clutch regulation valve assembly via the third three-way valve; wherein the first exhaust signal and drive default signal are configured to selectively engage a first subset of the plurality of torque-transmitting mechanisms to produce the low forward default gear ratio; and the second exhaust signal and drive default signal are configured to selectively engage a second subset of the plurality of torque-transmitting mechanisms to produce the high forward default gear ratio when the hydraulic control system is in a default mode of operation of the plurality of default modes of operation and the manual valve assembly is in the drive position.

Further additional features may be provided, including but not limited to the following: wherein the low forward default gear ratio is configured to be automatically engaged when at least one of the following occurs: 1) after an operator of the motor vehicle performs a key cycle on the motor vehicle while the default disable solenoid valve assembly provides the OFF signal; and 2) when the operator of the motor vehicle moves the manual valve assembly from the drive position to the reverse position and back to the drive position; wherein the reverse default signal is configured to engage a third subset of torque-transmitting mechanisms to produce the reverse default gear ratio when the hydraulic control system is in a default mode of operation of the plurality of default modes of operation and the manual valve assembly is in the reverse position; and wherein the low forward default gear ratio is a second gear ratio and the high forward default gear ratio is a seventh gear ratio Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DESCRIPTION

Figure 1:
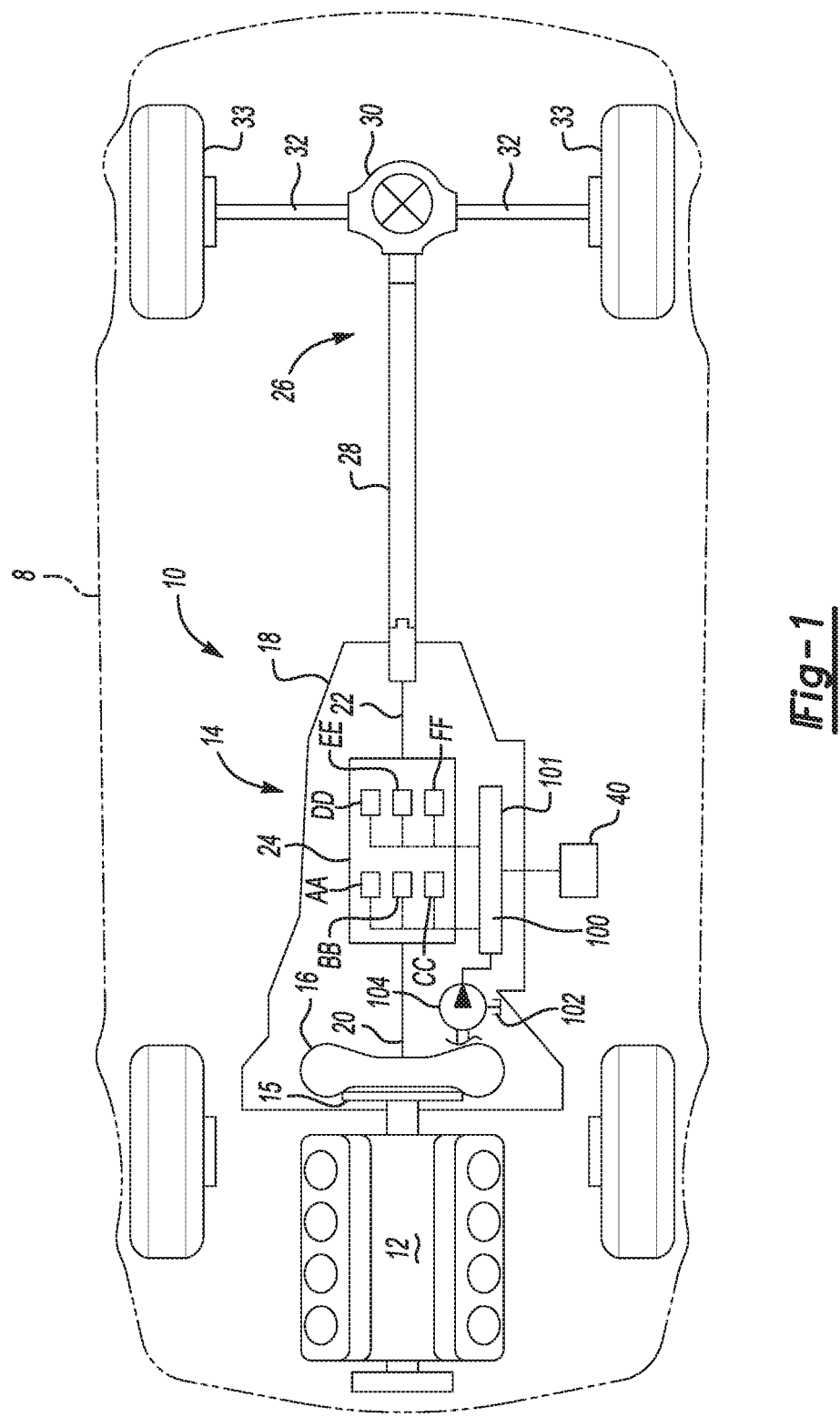
FIG. 1 is a is a schematic diagram of an exemplary powertrain in a motor vehicle according to the principles of the present disclosure.

With reference to FIG. 1, a motor vehicle is shown and generally indicated by reference number 8. The motor vehicle 8 is illustrated as a passenger car, but it should be appreciated that the motor vehicle 8 may be any type of vehicle, such as a truck, van, sport-utility vehicle, etc. The motor vehicle 8 includes an exemplary propulsion system 10. It should be appreciated at the outset that while a rear-wheel drive propulsion system 10 has been illustrated, the motor vehicle 8 may have a front-wheel drive propulsion system without departing from the spirit and scope of the present disclosure. The propulsion system 10 generally includes an engine 12 interconnected with a transmission 14.

The engine 12 may be a conventional internal combustion engine or an electric engine, hybrid engine, or any other type of prime mover, without departing from the spirit and scope of the present disclosure. The engine 12 supplies a driving torque to the transmission 14 through a flexplate 15 or other connecting device that is connected to a starting device 16. The starting device 16 may be a hydrodynamic device, such as a fluid coupling or torque converter, a wet dual clutch, or an electric motor, by way of example. It should be appreciated that any starting device 16 between the engine 12 and the transmission 14 may be employed, including a dry launch clutch.

The transmission 14 has a typically cast, metal housing 18 which encloses and protects the various components of the transmission 14. The housing 18 includes a variety of apertures, passageways, shoulders, and flanges that position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, a propshaft 28, a differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, six torque transmitting mechanisms, such as clutches or brakes, indicated schematically by reference letters AA, BB, CC, DD, EE, FF, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The torque transmitting mechanisms AA-FF are selectively engageable in combinations of four to initiate at least one of ten forward gear or speed ratios and one reverse gear or speed ratio by selectively coupling individual gears within the plurality of gear sets to the plurality of shafts. In one example, torque transmitting mechanisms AA and BB are friction brakes while torque transmitting mechanisms CC-FF are friction clutches. It should be appreciated that the specific arrangement and number of the gear sets and shafts within the transmission 14 may vary without departing from the spirit and scope of the present disclosure.

The motor vehicle 8 includes a transmission control module 40. The transmission control module 40 is preferably a non-generalized, electronic control device having a preprogrammed digital computer or processor, control logic or circuits, memory used to store data, and at least one I/O peripheral. The control logic includes or enables a plurality of logic routines for monitoring, manipulating, and generating data and control signals. The transmission control module 40 controls the actuation of the torque transmitting mechanisms AA-FF via a hydraulic control system 100.

The hydraulic control system 100 is disposed within a valve body 101 that contains and houses, via fluid paths and valve bores, most of the components of the hydraulic control system 100. These components include, but are not limited to, pressure regulation valves, directional valves, solenoids, etc. The valve body 101 may be attached to a bottom of the transmission housing 18 in rear-wheel drive transmissions or attached to a front of the transmission housing 18 in front-wheel drive transmissions. The hydraulic control system 100 is operable to selectively engage the clutches/brakes AA-FF and to provide cooling and lubrication to the transmission 14 by selectively communicating a hydraulic fluid from a sump 102 under pressure from an engine driven pump 104. The pump 104 may be driven by the engine 12 or by an auxiliary engine or electric motor.

With reference to FIGS. 2A-F, a portion of the hydraulic control system 100 is illustrated. The hydraulic control system 100 generally includes a plurality of interconnected or hydraulically communicating subsystems including a pressure regulator subsystem 106 and a clutch control subsystem 108. The hydraulic control system 100 may also include various other subsystems or modules not illustrated in the drawings.

The pressure regulator subsystem 106 is operable to provide and regulate pressurized hydraulic fluid, such as transmission oil, throughout the hydraulic control system 100. The pressure regulator subsystem 106 draws hydraulic fluid from the sump 102. The sump 102 is a tank or reservoir preferably disposed at the bottom of the transmission housing 18 to which the hydraulic fluid returns and collects from various components and regions of the transmission. The hydraulic fluid is forced from the sump 102 and communicated throughout the hydraulic control system 100 via the pump 104. The pump 104 may be a variable displacement pump, a gear pump, a vane pump, a gerotor pump, or any other positive displacement pump. The pump 104 may draw fluid in from the sump 102 through a filter 103.

The hydraulic fluid from the pump 104 is controlled by a pressure regulator valve, which may be a combined main regulation and priority valve 112. The combined main regulation and priority valve 112 regulates the pressure of the hydraulic fluid from the pump 104 and feeds pressurized hydraulic fluid at line pressure to a main supply line 114. A pump blow-off valve 108 may be included to release overpressure in the main supply line 114. The main supply line 114 may include other branches and feed other subsystems without departing from the scope of the present invention. The pressure regulator subsystem 106 may also include various other valves and solenoids, such as an isolator valve, without departing from the spirit and scope of the present disclosure.

The combined main regulation and priority valve 112 is further configured to supply pressurized hydraulic fluid to a secondary, non-priority line 105 to ultimate supply pressurized hydraulic fluid to a second-priority hydraulic circuit 107. The second-priority hydraulic circuit 107 may include, for example, a cooling hydraulic subsystem 109, a lubrication hydraulic subsystem 111, and/or a torque converter control subsystem 113. In addition, the combined main regulation and priority valve 112 is even further configured to supply pressurized hydraulic fluid to a third-priority decrease-pressure line 115.

The combined main regulation and priority valve 112 further includes a valve or spool 117 slidably disposed within a bore 119 formed in the valve body 101. The combined main regulation and priority valve 112 is movable to pressurize line pressure in the main supply line 114 as a first priority, to pressure the second-priority hydraulic circuit 107 as a second priority, and to feed excess pressure to the decrease-pressure circuit or line 115 as a third priority.

Figure 2A:
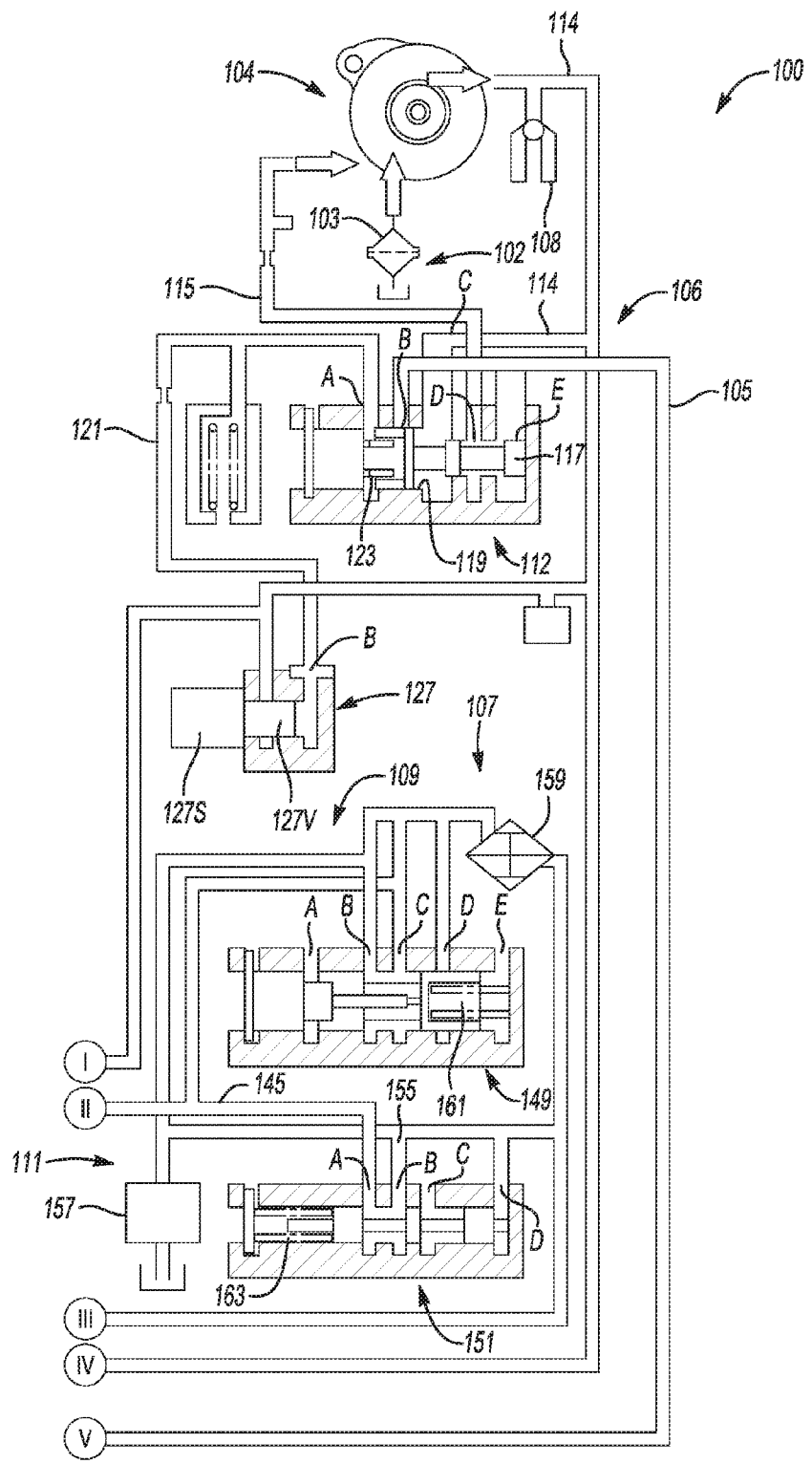
FIG. 2A is a diagram of a portion of a hydraulic control system according to the principles of the present disclosure.

More particularly, the combined main regulation and priority valve 112 includes ports 112A-E, numbered consecutively from left to right in FIG. 2A. The combined main regulation and priority valve 112 receives a signal pressure from signal line 121 into the first port 112A. The pressure signal through signal line 121 biases the spool 117 in a rightward direction in the orientation shown in FIG. 2A. The pressure in the signal line 121 originates from an outlet port B of a variable force solenoid valve 127 and into the inlet port 112A of the combined main regulation and priority valve 112. A biasing member, such as a spring 123, also biases the spool 117 toward the right, against line pressure 114. The port 112C is an inlet port to the combined regulation and priority valve 112 from the main supply line 114. The signal line pressure 121, therefore, regulates the delivery of hydraulic pressure in the main supply line 114. Thus, line pressure 114 is fed as a first priority from the pump 104 through the combined regulation and priority valve 112. The variable force solenoid valve 127 includes a solenoid 127S that translates a valve spool 127V.

In this variation, the variable force solenoid valve 127 is not combined with any anti-backflow valve. An anti-backflow valve can be removed because no electronic transmission range selection (ETRS) is present, no auxiliary pump for electronic start-stop is used, and no one-way clutch is combined with clutches AA-FF. Thus, the hydraulic control system 100 may be free of an anti-backflow valve in fluid communication with the combined regulation and priority valve 112. A simple VFS valve 127 without combining an anti-backflow valve may allow for improved packaging and cooler flow.

After line pressure 114 reaches an adequate predetermined level, the pressure from port 112C biases the spool 117 to the left against the spring 123 and connects ports 112B and 112C into fluid communication with each other. Port 112B is in communication with the non-priority line 105 that feeds the second-priority hydraulic circuit 107. When the non-priority line 105 is sufficiently pressurized, then spool 117 is moved further to the left against the spring 123 to bring the fourth port 112D into fluid communication with the main pressure line 114. As such, extra pressure originating with the pump 104 is then allowed to flow into the decrease-pressure circuit 115. Thus, the balance of forces acting on the main regulation and priority valve 112 controls the flow of hydraulic fluid from ports 112C to ports 112B and 112D. Port 112E is an exhaust port that communicates with the sump 102.

Accordingly, the combined regulation and priority valve 112 allows pressure to be fed first to the main supply line 114, second to the non-priority line 105, and lastly to the decrease-pressure circuit 115. In other words, the combined regulation and priority valve 112 opens to the pump out oil to the non-priority line 105 before opening the pump out oil to the decrease-pressure circuit 115, resulting in system stability.

In the example provided, the torque converter control subsystem 113 (see FIG. 2B) is pressurized by the non-priority line 105 through a torque converter regulator and control valve 129. The torque converter regulator and control valve 129 includes ports 129A-L, numbered consecutively from left to right in FIG. 2B. The torque converter regulator and control valve 129 includes a first valve spool 129R and a second valve spool 129S aligned with the first valve spool 129R.

The torque converter regulator and control valve 129 is utilized to direct the torque converter feed flow in apply and release modes and control the apply pressure of the clutch 141 of the torque converter 16A in apply mode. The torque converter regulator and control valve 129 is regulated by a variable force solenoid valve assembly 131 that supplies a signal pressure through a signal line 133 from an outlet port 131B of the variable force solenoid 131. The variable force solenoid valve assembly 131 may receive pressure through an inlet 131A from an isolator valve such as PTO valve assembly 135 and/or from the main priority supply line 114.

The signal line 133 is fed to an input port 129A of the torque converter regulator and control valve 129. A damper 137 may be provided in the signal line 133 to dampen oscillations in the signal line 133. The pressure signal through signal line 133 biases the spools 129R, 129S in a rightward direction in the orientation shown in FIG. 2B. A biasing member, such as a spring 139, biases the spools 129R, 129S against the signal line 133.

With the variable force solenoid valve assembly 131 commanded on and the torque converter regulator and control valve 129 in a fully stroked position, the hydraulic flow is directed to the clutch 141 of the torque converter 16A through the apply fluid line 143A from the outlet port 129J of the torque converter regulator and control valve 129. The pressure in the fluid line 143A controls the torque capacity of the torque converter clutch 141.

Ports 129E-F are the torque converter feed ports fed by the second-priority line 105, which feeds the torque converter feed ports 129E-F only when the output from the pump 102 is sufficient to achieve targeted delivered pump pressure, as described above. Ports 129B, 129H, 129I, and 129L are exhaust ports that communicate with the sump 102 or an exhaust backfill circuit (not shown). Port 129J is in communication with apply line 143A, and port 129K is in communication with the main supply line 114.

The converter return port 129D provides hydraulic fluid through the return line 145, which provides cooler and lubrication flow through an anti-drainback valve 147 to an inlet port 149C of a cooler bypass valve 149 in the cooling hydraulic subsystem and an inlet port 151A of a lubrication control valve 151 in the lubrication hydraulic subsystem 111. A blow off valve 153 may be located in the return line 145, or in another variation, the blow off valve 153 could be omitted and a blow off valve could be incorporated into the fluid line 143B that communicates with the torque converter 16A.

The anti-drainback valve 147 in the return line 145 prevents the torque converter clutch 141 from draining down through the cooling hydraulic subsystem 109 and the lubrication hydraulic subsystem 111 with the engine 12 off. Fluid in the return line 145 is directed to the inlet port 149C of the cooler bypass valve 149 and, in the installed or relaxed position, directs fluid to the outlet port 149B of the cooler bypass valve 149 and to the lubrication control port 151B of the lubrication control valve 151 and to a lubrication line 155 (which also communicates with port 151D) and the balance dam circuit 157 while bypassing the hydraulic fluid cooler 159.

The cooler bypass valve 149 may be configured to expand upon a temperature rise of the transmission 14 and stroke a spool 161 of the cooler bypass valve 149 to the right in the orientation of FIG. 2A. In a stroked position, the spool 161 directs the fluid flow in the return line 145 to the outlet port 149D and thence to the fluid cooler 159 and the lubrication line 155. The lubrication control valve 151 limits the pressure in the lubrication line 155 and the lubrication circuit to a value dictated by a valve spring 163 by bleeding excess flow to an exhaust port 151C. The cooler bypass valve 149 also may have exhaust ports 149A, 149E. Preferably, a hydraulic fluid temperature sensor 165 is disposed in the second fluid supply line and provides a real time indication of fluid temperature to the transmission control module 40.

Figure 2B:
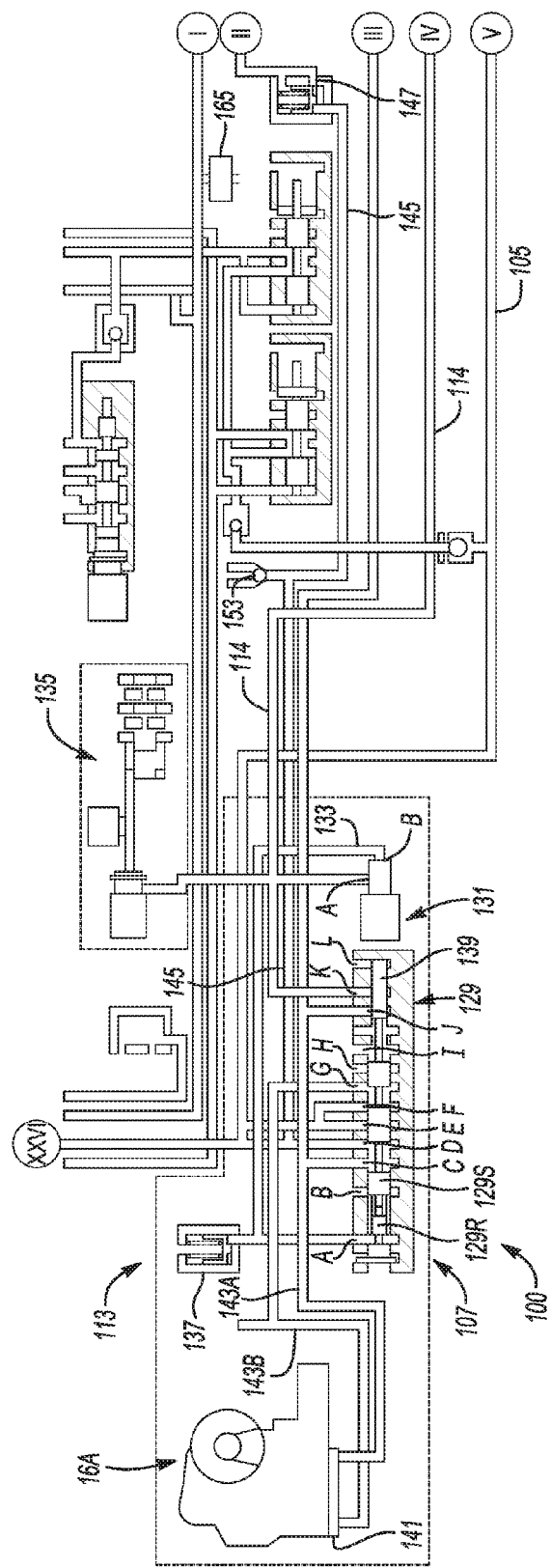
FIG. 2B is a diagram of a portion of a hydraulic control system according to the principles of the present disclosure.
Figure 2C:
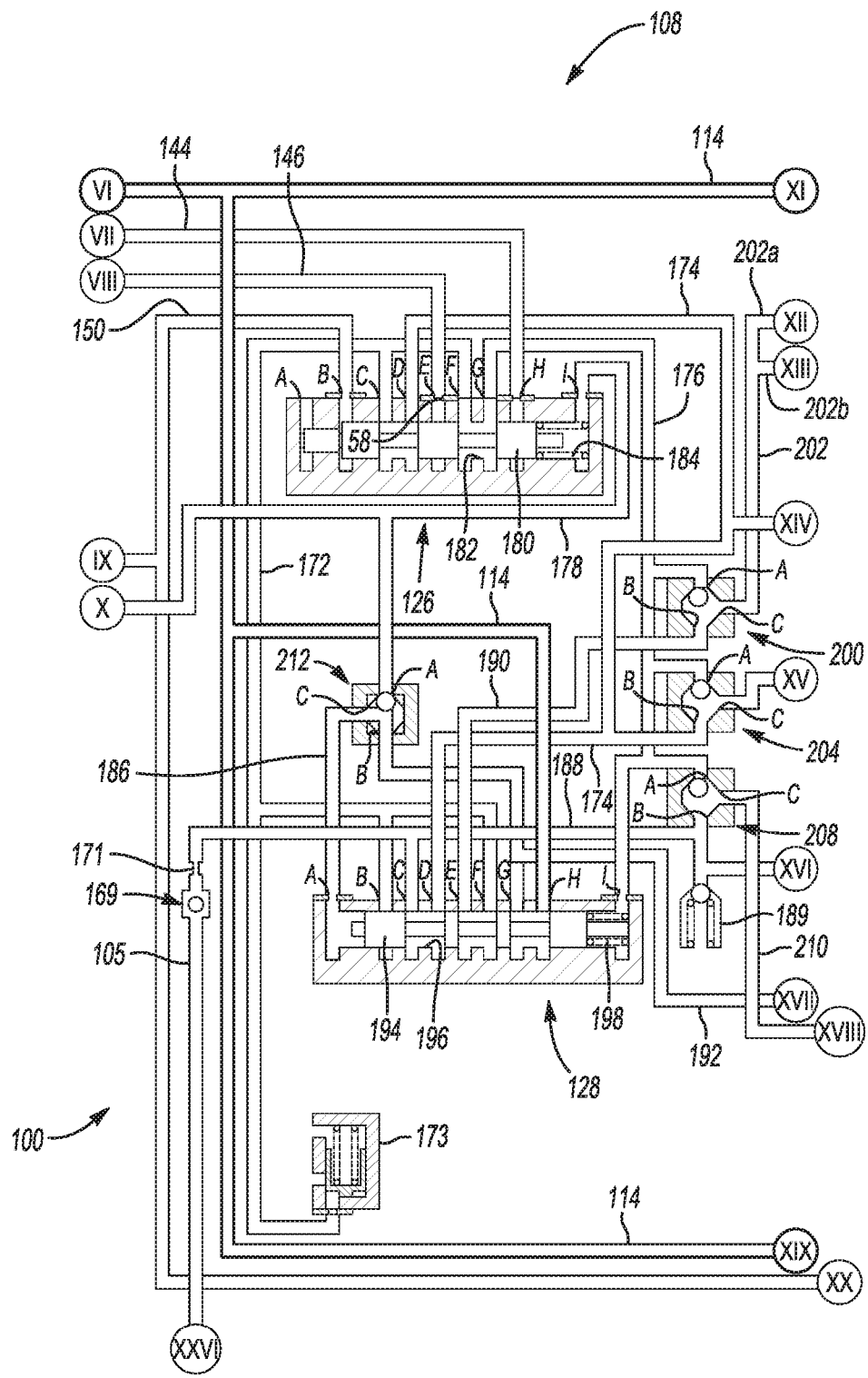
FIG. 2C is a diagram of a portion of a hydraulic control system according to the principles of the present disclosure.
Figure 2D:
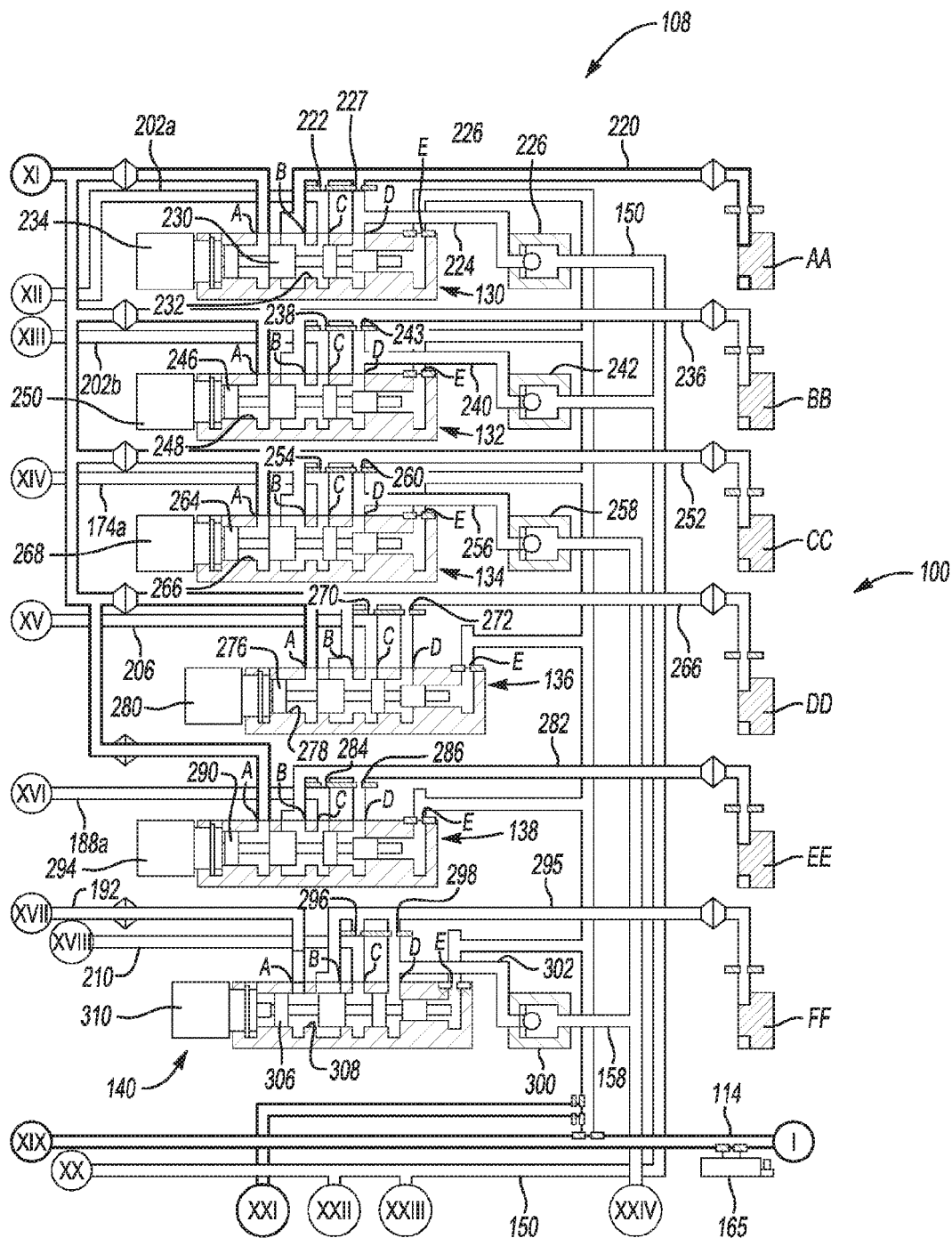
FIG. 2D is a diagram of a portion of a hydraulic control system according to the principles of the present disclosure.
Figure 2E:
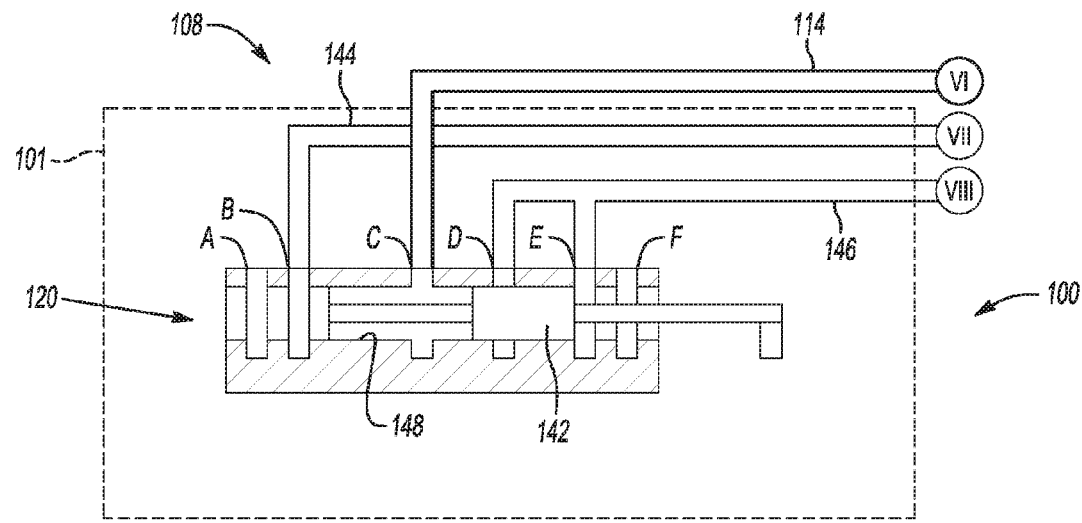
FIG. 2E is a diagram of a portion of a hydraulic control system according to the principles of the present disclosure.
Figure 2E:
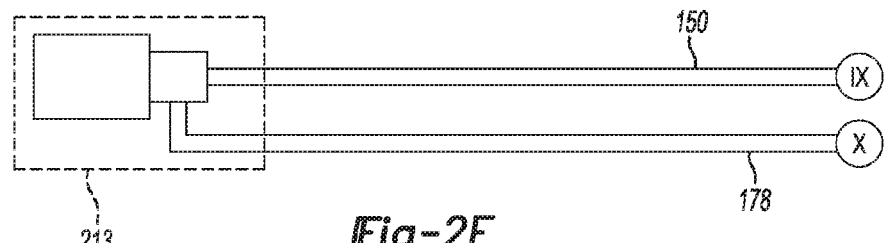
Figure 2F:
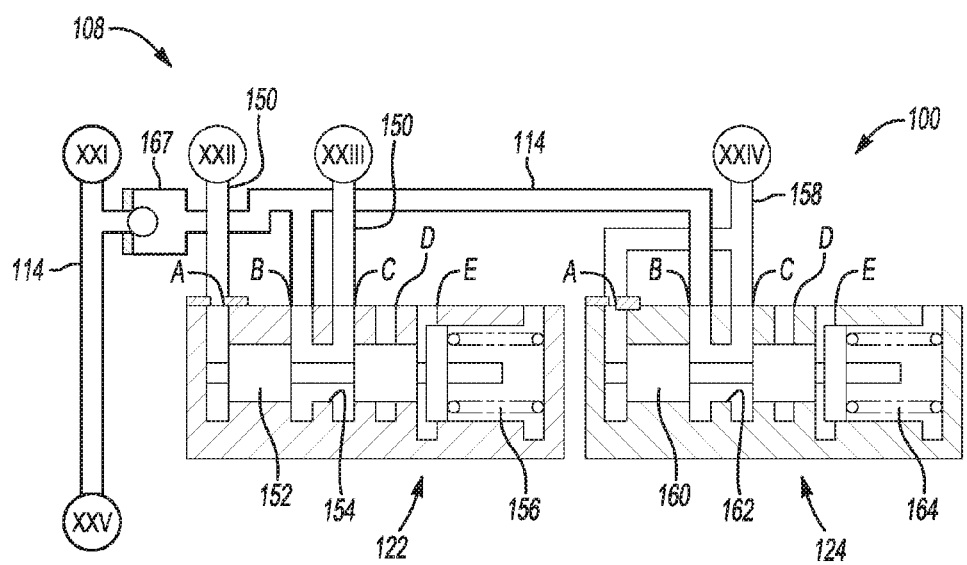
FIG. 2F is a diagram of a portion of a hydraulic control system according to the principles of the present disclosure.

Referring to FIGS. 2C-2F, along with FIGS. 2A-2B, the clutch control subsystem 108 controls the engagement and release of the torque transmitting mechanisms AA-FF. The clutch control subsystem 108 generally includes a manual valve assembly 120, a feed limit low valve assembly 122, a feed limit high valve assembly 124, a default disable valve assembly 126, a default select valve assembly 128, and a plurality of clutch AA-FF regulation valve assemblies 130, 132, 134, 136, 138, and 140 each associated with one of the torque transmitting mechanisms AA-FF, as will be described below.

The main supply line 114 communicates with, i.e. is connected to, the manual valve assembly 120 as well as the clutch AA-EE regulation valve assemblies 130-138. The manual valve assembly 120 includes a manual valve 142 connected to a range selector (not shown). Movement of the range selector by an operator of the motor vehicle 8 in turn translates the manual valve 142 between various positions including a reverse position and a drive position. The manual valve assembly 120 includes ports 120A-F, numbered consecutively from left to right in FIG. 2E. Ports 120A and 120F are exhaust ports that communicate with the sump 102. Port 120B is connected to a reverse feed line 144. Port 120C is connected to the main supply line 114. Ports 120D and 120E are connected to a drive feed line 146.

The manual valve 142 is slidably disposed within a bore 148 formed in the valve body 101. The manual valve 142 is moveable between at least a drive position and a reverse position, and may also include a neutral position or a park position. In the drive position, port 120C communicates with port 120D and port 120B exhausts through port 120A. In the reverse position, port 120C communicates with port 120B and port 120E exhausts through port 120F. Thus, pressurized fluid is selectively communicated from the main supply line 114 to one of the reverse feed line 144 and the drive feed line 146 depending on the position of the manual valve 142.

The feed limit low valve assembly 122 also receives pressurized hydraulic fluid from the pump 104 via the main supply line 114 and a one-way valve 167. The one-way valve 167 allows for fluid communication in one direction only from the pump 104 to the feed limit low valve assembly 122 and the feed limit high valve assembly 124. The feed limit low valve assembly 122 includes ports 122A-E, numbered consecutively from left to right in FIG. 2F. Ports 122A and 122C are connected to a feed limit low line 150. Port 122B is connected to the pump supply line 147. Ports 120D, 120E are exhaust ports that communicate with the sump 102 or an exhaust backfill circuit (not shown).

The feed limit low valve assembly 122 further includes a feed limit low valve or spool 152 slidably disposed within a bore 154 formed in the valve body 101. The feed limit low valve 152 is moveable to regulate pressurized hydraulic fluid flow from port 122B to port 122C using feedback pressure via port 122A. A biasing member 156, such as a coiled spring, biases the feed limit low valve 152 against the feedback pressure acting on the feed limit low valve 152 communicated through port 122A. Thus, the balance of forces acting on the feed limit low valve 152 controls the flow of hydraulic fluid from port 122B to port 122C.

The feed limit high valve assembly 124 operates in a manner similar to the feed limit low valve assembly 122, but is set at a relatively higher feedback pressure. The feed limit high valve assembly 124 also receives pressurized hydraulic fluid from the main supply line 114. The feed limit high valve assembly 124 includes ports 124A-E, numbered consecutively from left to right in FIG. 2F. Ports 124A and 124C are connected to a feed limit high line 158. Port 124B is connected to the main supply line 114. Ports 120D, 120E are exhaust ports that communicate with the sump 102 or an exhaust backfill circuit (not shown).

The feed limit high valve assembly 124 further includes a feed limit high valve or spool 160 slidably disposed within a bore 162 formed in the valve body 101. The feed limit high valve 160 is moveable to regulate pressurized hydraulic fluid flow from port 124B to port 124C using feedback pressure via port 124A. A biasing member 164, such as a coiled spring, biases the feed limit high valve 160 against the feedback pressure acting on the feed limit high valve 160 communicated through port 124A. Thus, the balance of forces acting on the feed limit high valve 160 controls the flow of hydraulic fluid from port 124B to port 124C.

The reverse and drive feed lines 144, 146 communicate with the default disable valve assembly 126. The default disable valve assembly 126 includes ports 126A-I, numbered consecutively from left to right in FIG. 2C. Port 126A is an exhaust port that communicates with the sump 102. Port 126B is connected to the feed limit low line 150. Ports 126C and 126F are connected to an exhaust backfill circuit 172 and blow-off valve 173 which preferably opens at low pressure, e.g., 3 psi. Port 126D is connected to a drive default line 174. Port 126E communicates with the drive feed line 146 via a reduced-diameter orifice 58. The reduced-diameter orifice 58 helps to minimize torque spikes during an initial default to 7$^{th}$ gear when the transmission 14 is operating at a lower gear. Port 126G is connected to a reverse default line 176. Port 126H is connected to the reverse feed line 144. Port 126I is connected to a signal line 178.

The default disable valve assembly 126 further includes a default valve or spool 180 slidably disposed within a bore 182 formed in the valve body 101. The default valve 180 is moveable between a default disable position, shown in FIG. 2C, and a default enable position, shown in FIGS. 3-5. A biasing member 184, such as a coiled spring, biases the default valve 180 to the default disable position. In the default disable position, port 126D communicates with port 126C, port 126E is closed, port 126F communicates with port 126G, and port 126H is closed. Thus, the drive default line 174 and reverse default line 176 exhaust and the drive feed line 146 and reverse feed line 144 are closed. In the default enable position, on the other hand, port 126C is closed, port 126D communicates with port 126E, port 126F is closed, and port 126G communicates with port 126H.

The default select valve assembly 128 is used to determine whether second or seventh gear is engaged during a transmission default condition. The default select valve assembly 128 includes ports 128A-I, numbered consecutively from left to right in FIG. 2C. Port 128A is connected to a signal line 186. Ports 128B and 128F are connected to the exhaust backfill circuit 172.

Port 128C is connected to a clutch EE/FF exhaust line 188 and to the non-priority line 105 through a ball check-valve 169 and a reduced-diameter orifice 171. The clutch EE/FF exhaust line 188 communicates with a drive default blow-off valve 189. The drive default blow-off valve 189 helps to minimize torque spikes, by limiting line pressure, during an initial default to 7$^{th}$ gear when the transmission 14 is operating at a lower gear. The one-way valve 169 is configured to permit a portion of the pressurized hydraulic fluid in the clutch EE/FF exhaust line 188 to flow to the non-priority line 105, and thus to the second-priority hydraulic circuit 107 (to provide cooling, lubrication, and/or torque converter control), when the hydraulic control circuit 100 is in a 7$^{th}$ gear default mode of operation. The clutch EE/FF exhaust line 188 flows to the non-priority line 105 through the one-way valve 169 when the pressure in the clutch EE/FF exhaust line 188 is greater than the pressure in the non-priority line 105.

Port 128D is connected to the drive default line 174. Port 128E is connected to a clutch AA/BB exhaust line 190. Port 128G is connected to a valve FF feed line 192. Port 128H is connected to the main supply line 114. Port 128I is connected to the reverse default line 176.

The default select valve assembly 128 further includes a default select valve or spool 194 slidably disposed within a bore 196 formed in the valve body 101. The default select valve 194 is moveable between a first position, shown in FIGS. 3 and 5, and a second position, shown in FIGS. 2C and 4. A biasing member 198, such as a coiled spring, biases the default select valve 194 to the first position. In the first position, port 128B communicates with port 128C, port 128D communicates with port 128E, port 128F communicates with port 128G, and port 128H is closed. In the second position, port 128B is closed, port 128C communicates with port 128D, port 128E communicates with port 128F, and port 128H communicates with port 128G.

The reverse default line 176 and the clutch AA/BB exhaust line 190 communicate with a three-way ball check valve 200. The three-way ball check valve 200 includes three ports 200A-C. Port 200A is connected to the reverse default line 176. Port 200B is connected to the clutch AA/BB exhaust line 190. Port 200C is connected to an exhaust line 202 having a clutch AA branch 202a and a clutch BB branch 202b. The clutch AA branch 202a is connected with the clutch AA regulation valve 130 and the clutch BB branch 202b is connected with the clutch BB regulation valve 132. The three-way ball check valve 200 closes off whichever of the ports 200A and 200B that is delivering the lower hydraulic pressure and provides communication between the output port 200C and whichever of the ports 200A and 200B is having or delivering the higher hydraulic pressure.

The reverse default line 176 and the drive default line 174 communicate with a three-way ball check valve 204. The three-way ball check valve 204 includes three ports 204A-C. Port 204A is connected to the reverse default line 176. Port 204B is connected to the drive default line 174. Port 204C is connected to a clutch DD exhaust line 206. The clutch DD exhaust line 206 is connected with the clutch DD regulation valve 136. The three-way ball check valve 204 closes off whichever of the ports 204A and 204B that is delivering the lower hydraulic pressure and provides communication between the outlet port 204C and whichever of the ports 204A and 204B is having or delivering the higher hydraulic pressure.

The reverse default line 176 and the clutch EE/FF exhaust line 188 communicate with a three-way ball check valve 208. The three-way ball check valve 208 includes three ports 208A-C. Port 208A is connected to the reverse default line 176. Port 208B is connected to the clutch EE/FF exhaust line 188. Port 208C is connected to a clutch FF exhaust line 210. The clutch EE/FF exhaust line 188 includes a clutch EE exhaust branch 188a that is connected to the clutch EE regulation valve 138. The clutch FF exhaust line 210 is connected with the clutch FF regulation valve 140. The three-way ball check valve 208 closes off whichever of the ports 208A and 208B that is delivering the lower hydraulic pressure and provides communication between the outlet port 208C and whichever of the ports 208A and 208B is having or delivering the higher hydraulic pressure.

The position of the default select valve assembly 128 may be commanded by pressurized fluid communicated through the signal line 186 from a three-way ball check valve 212. The three-way ball check valve 212 includes three ports 212A-C. Port 212A is connected to the signal line 178. Port 212B is connected to the valve FF feed line 192. Port 212C is connected to the signal line 186. The three-way ball check valve 212 closes off whichever of the ports 212A and 212B that is delivering the lower hydraulic pressure and provides communication between the outlet port 212C and whichever of the ports 212A and 212B is having or delivering the higher hydraulic pressure.

The signal line 178, which controls a position of the default disable valve assembly 126 as well as the default select valve assembly 128 via three-way ball check valve 212, is connected to a control device or solenoid 213. The solenoid 213 is fed hydraulic fluid via the feed limit low line 150. The solenoid 213 is preferably an on-off solenoid that selectively communicates the hydraulic fluid from the feed limit low line 150 to the signal line 178 upon receipt of a command from the transmission control module 40.

The main supply line 114 feeds the clutch AA regulation valve 130, the clutch BB regulation valve 132, the clutch CC regulation valve 134, and the clutch DD regulation valve 136. The main supply line 114 also feeds the valve FF feed line 192 via the default select valve assembly 128 when in the second position.

The clutch AA regulation valve assembly 130 controls the actuation of the clutch AA. The clutch AA regulation valve assembly 130 includes ports 130A-E, numbered consecutively from left to right in FIG. 2B. Port 130A is connected to the main supply line 114. Port 130B is connected to a clutch AA feed line 220 that communicates with clutch AA. Port 130C is connected to clutch AA exhaust branch 202*a* and to the clutch AA feed line 220 via a reduced-diameter orifice 222. Port 130D is connected to a fluid line 224 that communicates with a one-way valve 226 and with the clutch AA feed line 220 via a reduced-diameter orifice 227. The one-way valve 226 communicates with the feed limit low line 150 and selectively allows fluid communication from the fluid line 224 to the feed limit low line 150. Port 130E exhausts to the sump 102.

The clutch AA regulation valve assembly 130 further includes a clutch AA valve or spool 230 slidably disposed within a bore 232 formed in the valve body 101. The clutch AA valve 230 is moveable between a disengaged position where the valve 230 is moved to the left and an engaged position where the valve 230 is moved to the right. The clutch AA valve 230 is moveable by a solenoid 234. The solenoid 234 is preferably a normally low, linear force solenoid. In the disengaged position, port 130A is isolated, port 130B communicates with port 130C to exhaust the clutch AA feed line 220 through the clutch AA exhaust branch 202*a*, and port 130D acts on a differential area of the clutch AA valve 230. In the engaged position, port 130A communicates with port 130B to provide pressurized fluid to clutch AA. Excess pressure in the fluid line 224 opens the one-way valve 226 when the pressure exceeds that provided by the feed limit low valve assembly 122, thus bleeding off the pressure acting on the differential area of the clutch AA valve 230.

The clutch BB regulation valve assembly 132 controls the actuation of the clutch BB. The clutch BB regulation valve assembly 132 includes ports 132A-E, numbered consecutively from left to right in FIG. 2B. Port 132A is connected to the main supply line 114. Port 132B is connected to a clutch BB feed line 236 that communicates with clutch BB. Port 132C is connected to clutch B exhaust branch 202*b* and to the clutch BB feed line 236 via a reduced-diameter orifice 238. Port 132D is connected to a fluid line 240 that communicates with a one-way valve 242 and with the clutch BB feed line 236 via a reduced-diameter orifice 243. The one-way valve 242 communicates with the feed limit low line 150 and selectively allows fluid communication from the fluid line 240 to the feed limit low line 150. Port 132E exhausts to the sump 102.

The clutch BB regulation valve assembly 132 further includes a clutch BB valve or spool 246 slidably disposed within a bore 248 formed in the valve body 101. The clutch BB valve 246 is moveable between a disengaged position where the valve is moved to the left and an engaged position where the valve 246 is moved to the right. The clutch BB valve 246 is moveable by a solenoid 250. The solenoid 250 is preferably a normally low, linear force solenoid. In the disengaged position, port 132A is isolated, port 132B communicates with port 132C to exhaust the clutch BB feed line 236 through the clutch BB exhaust branch 202*b*, and port 132D acts on a differential area of the clutch BB valve 246. In the engaged position, port 132A communicates with port 132B to provide pressurized fluid to clutch BB. Excess pressure in the fluid line 240 opens the one-way valve 242 when the pressure exceeds that provided by the feed limit low valve assembly 122, thus bleeding off the pressure acting on the differential area of the clutch BB valve 246.

The clutch CC regulation valve assembly 134 controls the actuation of the clutch CC. The clutch CC regulation valve assembly 134 includes ports 134A-E, numbered consecutively from left to right in FIG. 2B. Port 134A is connected to the main supply line 114. Port 134B is connected to a clutch CC feed line 252 that communicates with clutch CC. Port 134C is connected to a clutch CC exhaust branch 174A of the drive default line 174 and to the clutch CC feed line 252 via a reduced-diameter orifice 254. Port 134D is connected to a fluid line 256 that communicates with a one-way valve 258 and with the clutch CC feed line 252 via a reduced-diameter orifice 260. The one-way valve 258 communicates with the feed limit high line 158 and selectively allows fluid communication from the fluid line 256 to the feed limit high line 158. Port 134E exhausts to the sump 102.

The clutch CC regulation valve assembly 134 further includes a clutch CC valve or spool 264 slidably disposed within a bore 266 formed in the valve body 101. The clutch CC valve 264 is moveable between a disengaged position where the valve 264 is moved to the left and an engaged position where the valve 264 is moved to the right. The clutch CC valve 264 is moveable by a solenoid 268. The solenoid 268 is preferably a normally low, linear force solenoid. In the disengaged position, port 134A is isolated, port 134B communicates with port 134C to exhaust the clutch CC feed line 252 through the drive default line 174, and port 134D acts on a differential area of the clutch CC valve 264. In the engaged position, port 134A communicates with port 134B to provide pressurized fluid to clutch CC. Excess pressure in the fluid line 256 opens the one-way valve 258 when the pressure exceeds that provided by the feed limit high valve assembly 124, thus bleeding off the pressure acting on the differential area of the clutch CC valve 264.

The clutch DD regulation valve assembly 136 controls the actuation of the clutch DD. The clutch DD regulation valve assembly 136 includes ports 136A-E. Port 136A is connected to the main supply line 114. Port 136B is connected to a clutch DD feed line 266 that communicates with clutch DD. Port 136C is connected to the clutch DD exhaust line 206 and to the clutch DD feed line 266 via a reduced-diameter orifice 270. Port 136D is connected to the clutch DD feed line 266 via a reduced-diameter orifice 272. Port 136G communicates with the clutch DD feed line 266 via an orifice 274. Port 136E is an exhaust port that communicates with the sump 102.

The clutch DD regulation valve assembly 136 further includes a clutch DD valve or spool 276 slidably disposed within a bore 278 formed in the valve body 101. The clutch DD valve 276 is moveable between a disengaged position where the valve 276 is moved to the left and an engaged position where the valve 276 is moved to the right. The clutch DD valve 276 is moveable by a solenoid 280. The solenoid 280 is preferably a normally low, linear force solenoid. In the disengaged position, port 136A is isolated, port 136B communicates with port 136C to exhaust the clutch DD feed line 266 through the clutch DD exhaust line 206, and port 136D acts on a differential area of the clutch DD valve 276. In the engaged position, port 136A communicates with port 136B to provide pressurized fluid to the clutch DD feed line 266, and port 136C is isolated.

The clutch EE regulation valve assembly 138 controls the actuation of the clutch EE. The clutch EE regulation valve assembly 138 includes ports 138A-E, numbered consecutively from left to right in FIG. 2B. Port 138A is connected to the main supply line 114. Port 138B is connected to a clutch EE feed line 282 that communicates with clutch EE. Port 138C is connected to the clutch EE exhaust branch 188a and to the clutch EE feed line 282 via a reduced-diameter orifice 284. Port 138D is connected to the clutch EE feed line 282 via a reduced-diameter orifice 286. Port 138E exhausts to the sump 102.

The clutch EE regulation valve assembly 138 further includes a clutch EE valve or spool 290 slidably disposed within a bore 292 formed in the valve body 101. The clutch EE valve 290 is moveable between a disengaged position where the valve 290 is moved to the left and an engaged position where the valve 290 is moved to the right. The clutch EE valve 290 is moveable by a solenoid 294. The solenoid 294 is preferably a normally low, linear force solenoid. In the disengaged position, port 138A is isolated, port 138B communicates with port 138C to exhaust the clutch EE feed line 282 through the clutch EE exhaust branch 188a, and port 138D acts on a differential area of the clutch EE valve 290. In the engaged position, port 138A communicates with port 138B to provide pressurized fluid to clutch EE and port 138C is isolated.

The clutch FF regulation valve assembly 140 controls the actuation of the clutch FF. The clutch FF regulation valve assembly 140 includes ports 140A-E. Port 140A is connected to the clutch FF feed line 192. Port 140B is connected to a clutch FF feed line 295 that communicates with clutch FF. Port 140C is connected to the clutch FF exhaust line 210 and to the clutch FF feed line 295 via a reduced-diameter orifice 296. Port 140D is connected to the clutch FF feed line 295 via a reduced-diameter orifice 298 and to a one-way valve 300 via a fluid line 302. The one-way valve 300 communicates with the feed limit high line 158 and selectively allows fluid communication from the fluid line 302 to the feed limit high line 158. Port 140E is an exhaust port that communicates with the sump 102.

The clutch FF regulation valve assembly 140 further includes a clutch FF valve or spool 306 slidably disposed within a bore 308 formed in the valve body 101. The clutch FF valve 306 is moveable between a disengaged position where the valve 306 is moved to the left and an engaged position where the valve 306 is moved to the right. The clutch FF valve 306 is moveable by a solenoid 310. The solenoid 310 is preferably a normally low, linear force solenoid. In the disengaged position, port 140A is isolated, port 140B communicates with port 140C to exhaust the clutch FF feed line 295 through the clutch FF exhaust line 210, and port 140D acts on a differential area of the clutch FF valve 306. In the engaged position, port 140A communicates with port 140B to provide pressurized fluid to the clutch FF feed line 295, and port 140C is isolated. Excess pressure in fluid line 302 opens the one-way valve 300 when the pressure exceeds that provided by the feed limit high valve assembly 124, thus bleeding off the pressure acting on the differential area of the clutch FF valve 306.

The hydraulic control system 100 is operable to provide two alternative forward gear ratios and one reverse gear ratio during a transmission default condition. During a default condition, where the transmission 14 experiences an absence of electronic control, the transmission 14 no longer has the capability to electronically command solenoids to achieve the desired gear state. Accordingly, the solenoids 213, 234, 250, 268, 280, 294, and 310 are deactivated and the corresponding valves 230, 246, 264, 276, 290, and 306 are in the disengaged state. Meanwhile, the regulated pressure supplied to the main supply line 114 from the pressure regulator subsystem 106 defaults to the pressure provided from the pump 104.

Figure 3:
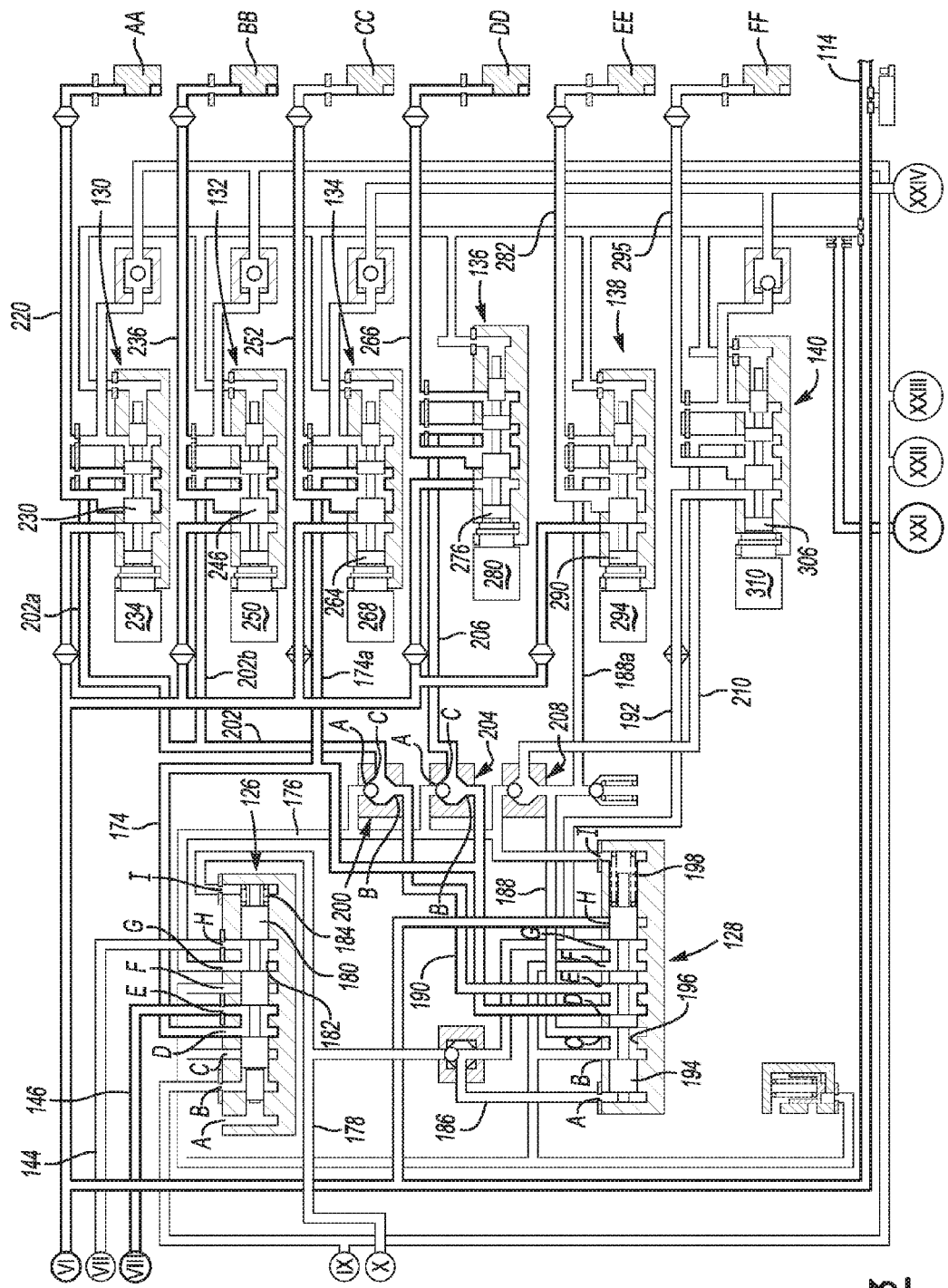
FIG. 3 is a diagram of a portion of the hydraulic control system in a default second forward gear condition according to the principles of the present disclosure.

With reference to FIG. 3, a default condition is illustrated where the transmission 14 provides the $2^{nd}$ gear ratio during the default. To establish the $2^{nd}$ gear ratio, clutches AA, BB, CC, DD must be engaged, i.e., supplied with pressurized oil. When the manual valve 142 is in the drive position (moved to the right in FIG. 2E), oil is communicated to the drive feed line 146. In the default condition, the solenoid 213 closes, moving the default disable valve assembly 126 to the enable position. The drive feed line 146 thus feeds the drive default line 174. Pressurized oil then communicates into the clutch CC exhaust branch 174a and into the clutch CC feed line 252 to engage clutch CC. Also, pressurized oil from the drive default line 174 closes port 204A of the three-way ball check valve 204 and pressurized oil communicates from the drive default line 174 to the clutch DD exhaust line 206. Oil from the clutch DD exhaust line 206 communicates into the clutch DD feed line 266 to engage clutch DD. During the default, spring 198 moves the valve 194 of the default select valve assembly 128 to the first position. Here, the drive default line 174 communicates with the clutch AA/BB exhaust line 190. Pressurized oil then closes port 200A of the three-way ball check valve 200 and pressurized oil communicates into the clutch AA exhaust branch 202a and the clutch BB exhaust branch 202b. Pressurized oil communicates from the clutch AA exhaust branch 202a into the clutch AA feed line 220 to engage clutch AA while pressurized oil communicates from the clutch BB exhaust branch 202b into the clutch BB feed line 236 to engage clutch BB. Meanwhile, clutch EE exhausts through the clutch EE exhaust branch 188a to the clutch EE/FF exhaust line 188 and clutch FF exhausts through the clutch FF exhaust line 210, the three-way ball check valve 208, and into the clutch EE/FF exhaust line 188. Therefore, during the low gear default condition, clutches AA, BB, CC, and DD are engaged, thereby providing a second gear ratio.

Figure 4:
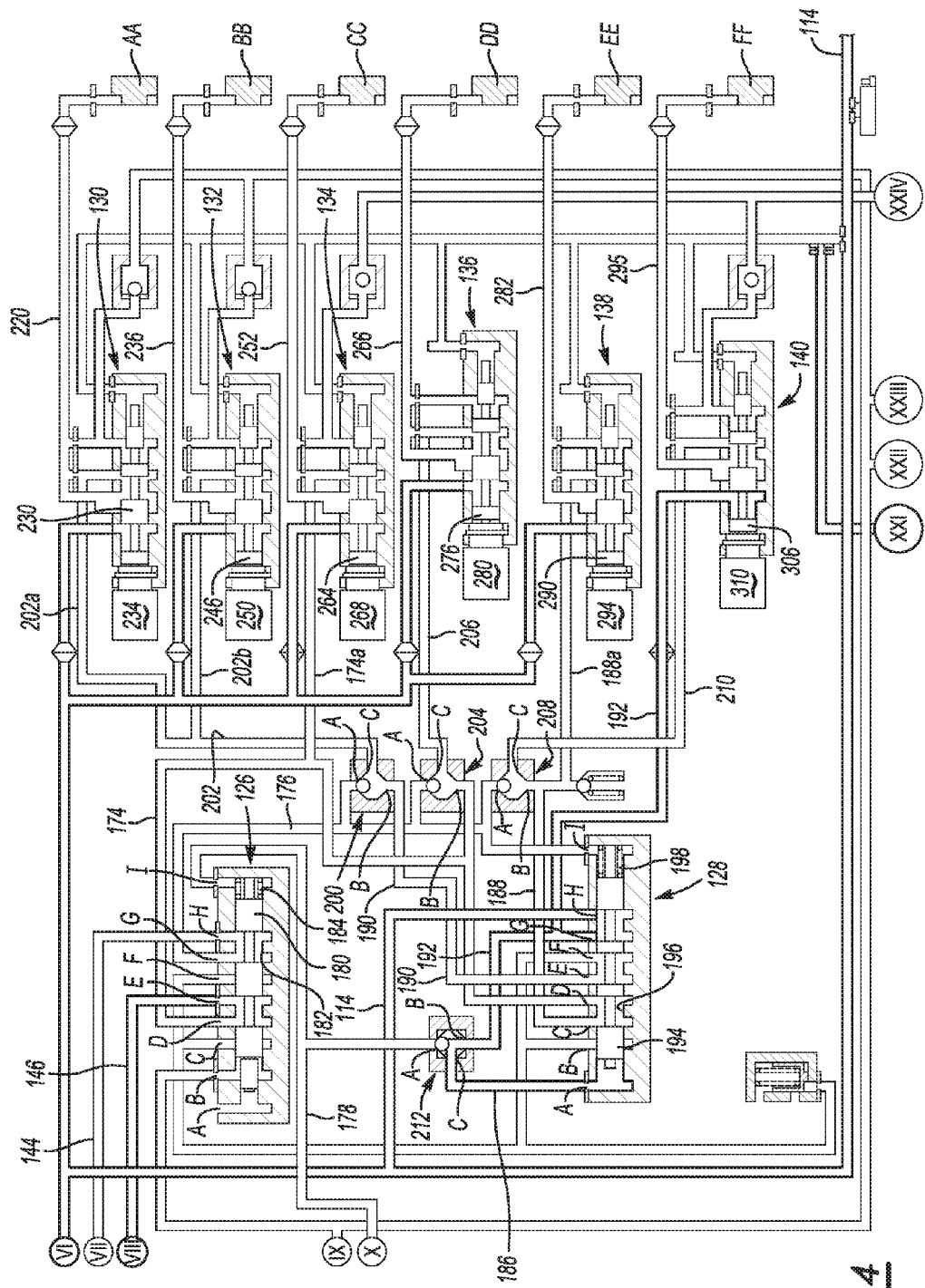
FIG. 4 is a diagram of a portion of the hydraulic control system in a default seventh forward gear condition according to the principles of the present disclosure.

With reference to FIG. 4, a default condition is illustrated where the transmission 14 provides the $7^{th}$ gear ratio during the default. To establish the $7^{th}$ gear ratio, clutches CC, DD, EE, and FF must be engaged, i.e., supplied with pressurized hydraulic fluid or oil. During normal operations, the solenoid 213 is opened and moves the default select valve assembly 128 to the second position. When the manual valve 142 is in the drive position (moved to the right in FIG. 2C), oil is communicated to the drive feed line 146. In the default condition, the solenoid 213 closes, moving the default disable valve assembly 126 to the enable position. The drive feed line 146 thus feeds the drive default line 174. Pressurized oil then communicates into the clutch CC exhaust branch 174a and into the clutch CC feed line 252 to engage clutch CC. Also, pressurized oil from the drive default line 174 closes port 204A of the three-way ball check valve 204 and pressurized oil communicates from the drive default line 174 to the clutch DD exhaust line 206. Oil from the clutch DD exhaust line 206 communicates into the clutch DD feed line 266 to engage clutch DD.

If the default occurs when the motor vehicle 8 is running in any gear while in a Drive position, pressurized oil from the main supply line 114 communicates into the clutch FF feed line 192, closes port 212A of the three-way ball check valve 212, and keeps the default select valve assembly 128 in the second position. Thus, the drive default line 174 communicates with the clutch EE/FF exhaust line 188 through the default select valve assembly 128. Pressurized oil then closes port 208A of the three-way ball check valve 208, and pressurized oil communicates into the clutch FF exhaust line 210. Pressurized oil also communicates from the clutch EE/FF exhaust line 188 into the clutch EE exhaust branch 188a. Pressurized oil communicates from the clutch EE exhaust branch 188a into the clutch EE feed line 282 to engage clutch EE while pressurized oil communicates from the clutch FF exhaust line 210 into the clutch FF feed line 295 to engage clutch FF. Meanwhile, clutch AA exhausts through the clutch AA exhaust branch 188a to the clutch AA/BB exhaust line 202, and clutch BB exhausts through the clutch BB exhaust branch 202b to the clutch AA/BB exhaust line 202. The exhaust from the clutches AA, BB closes port 200A of the three-way ball check valve 200 and exhausts through the default select valve assembly 128. Therefore, during the default condition, clutches CC, DD, EE, and FF are engaged, thereby providing the $7^{th}$ gear ratio.

The default select valve assembly 128 transitions from the second position, enabling $7^{th}$ gear, to the first position, enabling $2^{nd}$ gear, when pressurized oil from the reverse feed line 144 and the reverse default line 176 breaks the latch on the default select valve assembly 128 after a shift to reverse. The default select valve assembly 128 also transitions from the second position to the first position after a loss of all hydraulic pressure, for example when the engine 12 and pump 104 are turned off. In addition, by routing a supply of pressurized oil from the main supply line 114 to the clutch FF feed line 192 through the default select valve assembly 128, clutch FF cannot be applied unless the default select valve assembly 128 is in the second (default $7^{th}$ gear) position. Since clutch FF is required to engage $4^{th}$-$10^{th}$ gears, this ensures that there is no possibility of a default from $4^{th}$-$10^{th}$ gears to $2^{nd}$ gear if the default select valve 194 becomes stuck in the first ($2^{nd}$ gear) position.

Figure 5:
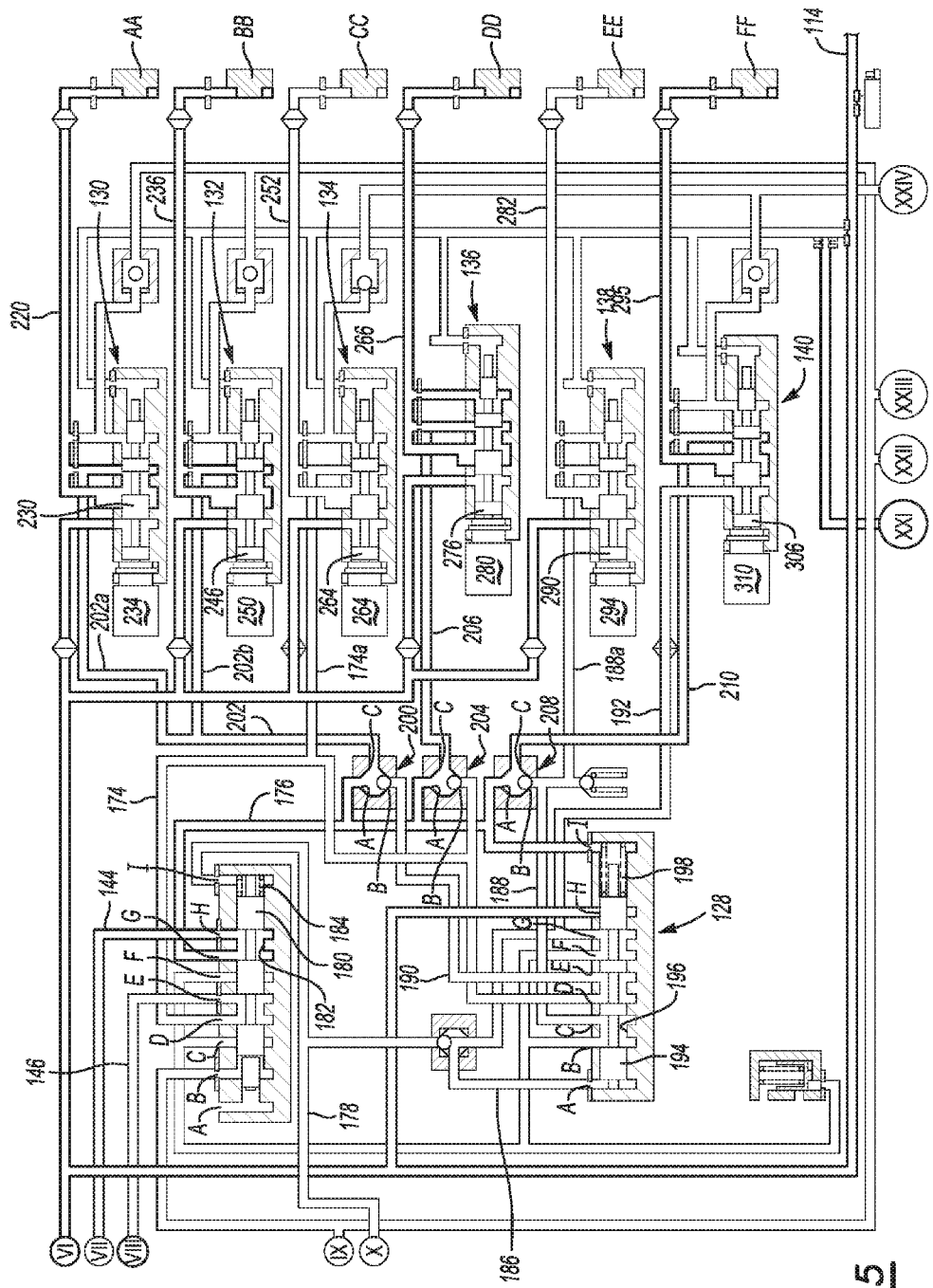
FIG. 5 is a diagram of a portion of the hydraulic control system in a default reverse condition according to the principles of the present disclosure.

Turning to FIG. 5, a default condition while in a reverse gear state is illustrated. To establish a reverse gear ratio, clutches AA, BB, DD, and FF must be engaged, i.e., supplied with pressurized hydraulic fluid or oil. When the manual valve assembly 120 is in the reverse position (moved to the left in FIG. 2C), oil is communicated to the reverse feed line 144. In the default condition, the solenoid 213 closes, moving the default disable valve assembly 126 to the enable position. The reverse feed line 144 thus feeds the reverse default line 176. Pressurized oil from the reverse default line 176 then closes off ports 200B, 204B, and 208B of the three-way ball check valves 200, 204, and 208, respectively. Pressurized oil communicates into the clutch AA exhaust branch 202a and the clutch BB exhaust branch 202b from the three-way ball check valve 200. From the clutch AA exhaust branch 202a, pressurized oil feeds into the clutch AA feed line 220 to engage clutch AA while pressurized oil feeds from the clutch BB exhaust branch 202b into the clutch BB feed line 236 to engage clutch BB. Pressurized oil communicates into the clutch DD exhaust line 206 from the three-way ball check valve 204. From the clutch DD exhaust line 206, pressurized oil communicates into the clutch DD feed line 266 to engage clutch DD. Finally, pressurized oil communicates into the clutch FF exhaust line 210 from the three-way ball check valve 208. From the clutch FF exhaust line 210, pressurized oil communicates into the clutch FF feed line 295 to engage clutch DD. Clutches CC and EE exhaust through the default select valve assembly 128. Therefore, during the default condition while the manual valve assembly 120 is in reverse, clutches AA, BB, DD, and FF are engaged, thereby providing a reverse gear ratio.

The description is merely exemplary in nature and variations that do not depart from the general essence of this disclosure are intended to be within the scope of the disclosure. Such variations are not to be regarded as a departure from the spirit and scope of the disclosure.

What is claimed is:

1. A hydraulic control system for a transmission of a motor vehicle, the hydraulic control system comprising:
    a pressure regulation subsystem in fluid communication with a pump, the pressure regulation subsystem being configured to provide pressurized hydraulic fluid;
    a second-priority hydraulic circuit in fluid communication with the pressure regulation subsystem, the second-priority hydraulic circuit including at least one of a cooling hydraulic subsystem, a lubrication hydraulic subsystem, and a torque converter control subsystem;
    a manual valve assembly in fluid communication with the pressure regulation subsystem, the manual valve assembly being moveable between at least a park position, a neutral position, a drive position, and a reverse position;
    a default disable valve assembly in fluid communication with the manual valve assembly;
    a default disable solenoid valve assembly in fluid communication with the default disable valve assembly, the default disable solenoid valve assembly being configured to enable the default disable valve assembly to enable a plurality of default modes of operation;
    a default select valve assembly in fluid communication with the default disable valve assembly, the default select valve assembly being configured to select between at least a portion of the plurality of default modes of operation;
    a blow-off valve in fluid communication with the default select valve assembly, the blow-off valve being configured to limit line pressure during the plurality of default modes of operation; and
    a one-way valve configured to permit a portion of the pressurized hydraulic fluid to flow to the second-priority hydraulic circuit when the hydraulic control system is in a default mode of operation of the plurality of default modes of operation.

2. The hydraulic control system of claim 1, wherein the pressure regulation subsystem comprises a combined main regulation and priority valve, the combined main regulation and priority valve being configured to pressurize line pressure in the hydraulic control system as a first priority, to pressurize the second-priority hydraulic circuit as a second priority, and to feed excess pressure to a decrease-pressure circuit as a third priority.

3. The hydraulic control system of claim 2, further comprising a plurality of clutch regulation valve assemblies in fluid communication with the pressure regulation subsystem, the manual valve assembly, the default disable valve assembly, and the default select valve assembly, wherein the plurality of clutch regulation valve assemblies is configured to engage a plurality of torque-transmitting mechanisms.

4. The hydraulic control system of claim 3, wherein each of the plurality of clutch regulation valve assemblies includes an exhaust port configured to exhaust a torque-transmitting mechanism of the plurality of torque-transmitting mechanisms in a normal mode of operation and wherein each of the exhaust ports is in selective communication with the default disable valve assembly and the default select valve assembly, each exhaust port being configured to selectively receive pressurized hydraulic fluid in at least one default mode of the plurality of default modes of operation.

5. The hydraulic control system of claim 4, wherein each exhaust port of each clutch regulation valve assembly of the plurality of clutch regulation valve assemblies selectively communicates with at least one of the default disable valve assembly and the default select valve assembly via at least one three-way valve of a plurality of three-way valves.

6. The hydraulic control system of claim 5, wherein the default disable valve assembly is configured to selectively communicate pressurized hydraulic fluid from the manual valve assembly to the default select valve assembly when in the drive position, the default select valve assembly being configured to selectively communicate pressurized hydraulic fluid to a first subset of the plurality of clutch regulation valve assemblies to provide a low default gear ratio and to a second subset of the plurality of clutch regulation valve assemblies to provide a high default gear ratio, the high default gear ratio having a higher gear speed than the low default gear ratio.

7. The hydraulic control system of claim 6, wherein the default disable valve assembly is configured to selectively communicate pressurized hydraulic fluid from the manual valve assembly to the plurality of three-way valves to provide a reverse default gear ratio.

8. The hydraulic control system of claim 7, wherein a position of the default select valve assembly is configured to be controlled by pressurized hydraulic fluid from the manual valve assembly and a spring when engaged in the high default gear ratio, from at least one of the clutch regulation valve assemblies of the plurality of clutch regulation valve assemblies and the spring when engaged in the low default gear ratio, and from the manual valve assembly and at least one of the clutch regulation valve assemblies of the plurality of clutch regulation valve assemblies when engaged in the reverse default gear ratio.

9. The hydraulic control system of claim 8, wherein the plurality of torque-transmitting mechanisms includes six torque-transmitting mechanisms selectively engageable in combinations of four to provide at least 10 forward speed ratios and one reverse speed ratio.

10. The hydraulic control system of claim 9, the hydraulic control system being free of an anti-backflow valve in fluid communication with the combined main regulation and priority valve.

11. A hydraulic control system for a transmission of a motor vehicle, the hydraulic control system comprising:
   a pressure regulation subsystem in fluid communication with a pump, the pressure regulation subsystem comprising a combined main regulation and priority valve configured to provide pressurized hydraulic fluid;
   a second-priority hydraulic circuit in fluid communication with the pressure regulation subsystem, the second-priority hydraulic circuit including at least one of a cooling hydraulic subsystem, a lubrication hydraulic subsystem, and a torque converter control subsystem, the combined main regulation and priority valve being configured to pressurize line pressure in the hydraulic control system as a first priority, to pressurize the second-priority hydraulic circuit as a second priority, and to feed excess pressure to a decrease-pressure circuit as a third priority;
   a manual valve assembly in fluid communication with the pressure regulation subsystem, the manual valve assembly being moveable between at least a park position, a neutral position, a drive position, and a reverse position;
   a default disable valve assembly in fluid communication with the manual valve assembly;
   a default disable solenoid valve assembly in fluid communication with the default disable valve assembly, the default disable solenoid valve assembly being configured to enable the default disable valve assembly to enable a plurality of default modes of operation;
   a default select valve assembly in fluid communication with the default disable valve assembly, the default select valve assembly being configured to select between at least a portion of the plurality of default modes of operation; and
   a plurality of clutch regulation valve assemblies in fluid communication with the pressure regulation subsystem, the manual valve assembly, the default disable valve assembly, and the default select valve assembly, wherein the plurality of clutch regulation valve assemblies is configured to engage a plurality of torque-transmitting mechanisms.

12. The hydraulic control system of claim 11, the manual valve assembly being configured to selectively provide a drive fluid signal and a reverse fluid signal from the pressurized hydraulic fluid, the default disable valve assembly being configured to receive the drive fluid signal and the reverse fluid signal, the default disable solenoid valve assembly being configured to selectively engage the default disable valve assembly through an ON signal and an OFF signal, the default disable valve assembly having a first position configured to terminate the drive fluid signal and the reverse fluid signal when the default disable valve assembly receives the ON signal from the default disable solenoid valve assembly, the default disable valve assembly having a second position configured to communicate the drive fluid signal and the reverse fluid signal to a drive default fluid signal and a reverse default fluid signal when the default disable valve assembly receives the OFF signal from the default disable solenoid valve assembly, the default select valve assembly configured to receive the drive default fluid signal, the default select valve assembly having a first position configured to communicate the drive default fluid signal to a first exhaust signal and a second position configured to communicate the drive default fluid signal to a second exhaust signal, the plurality of clutch regulation valve assemblies being selectively in fluid communication with the first exhaust signal, the second exhaust signal, the drive default signal, and the reverse default signal.

13. The hydraulic control system of claim 12, the plurality of default modes of operation including a low forward default gear ratio, a high forward default gear ratio, and a reverse default gear ratio, the default select valve assembly being configured to select between the low forward default gear ratio and the high forward default gear ratio.

14. The hydraulic control system of claim 13, wherein each clutch regulation valve assembly of the plurality of clutch regulation valve assemblies includes an exhaust port configured to exhaust a torque-transmitting mechanism of the plurality of torque-transmitting mechanisms in a normal mode of operation, and wherein each of the exhaust ports is in selective communication with the default disable valve assembly and the default select valve assembly, each exhaust port being configured to selectively receive pressurized hydraulic fluid in the plurality of default modes of operation, each exhaust port being configured to selectively communicate with at least one of the default disable valve assembly and the default select valve assembly via at least one three-way valve of a plurality of three-way valves.

15. The hydraulic control system of claim 14, wherein:
in the low forward default gear ratio, the first exhaust signal communicates with the exhaust port of a first clutch regulation valve assembly and the exhaust port of a second clutch regulation valve assembly of the plurality of clutch regulation valve assemblies via a first three-way valve of the plurality of three-way valves, and the drive default signal communicates with the exhaust port of a third clutch regulation valve assembly and the exhaust port of a fourth clutch regulation valve assembly of the plurality of clutch regulation valve assemblies via a second three-way valve of the plurality of three-way valves;
in the high forward default gear ratio, the second exhaust signal communicates with the exhaust port of a fifth clutch regulation valve assembly and the exhaust port of a sixth clutch regulation valve assembly of the plurality of clutch regulation valve assemblies via a third three-way valve of the plurality of three-way valves, and the drive default signal communicates with the exhaust port of the third clutch regulation valve assembly and the exhaust port of the sixth clutch regulation valve assembly via the second three-way valve; and
in the reverse default gear ratio, the reverse default signal communicates with the exhaust port of the first clutch regulation valve assembly and the exhaust port of the second clutch regulation valve assembly via the first three-way valve, the reverse default signal communicates with the exhaust port of the fourth clutch regulation valve assembly via the second three-way valve, and the reverse default signal communicates with the exhaust port of the sixth clutch regulation valve assembly via the third three-way valve.

16. The hydraulic control system of claim 15, wherein the first exhaust signal and drive default signal are configured to selectively engage a first subset of the plurality of torque-transmitting mechanisms to produce the low forward default gear ratio, and the second exhaust signal and drive default signal are configured to selectively engage a second subset of the plurality of torque-transmitting mechanisms to produce the high forward default gear ratio when the hydraulic control system is in a default mode of operation of the plurality of default modes of operation and the manual valve assembly is in the drive position.

17. The hydraulic control system of claim 16, wherein the low forward default gear ratio is configured to be automatically engaged when at least one of the following occurs: 1) after an operator of the motor vehicle performs a key cycle on the motor vehicle while the default disable solenoid valve assembly provides the OFF signal; and 2) when the operator of the motor vehicle moves the manual valve assembly from the drive position to the reverse position and back to the drive position.

18. The hydraulic control system of claim 17, wherein the reverse default signal is configured to engage a third subset of torque-transmitting mechanisms to produce the reverse default gear ratio when the hydraulic control system is in a default mode of operation of the plurality of default modes of operation and the manual valve assembly is in the reverse position.

19. The hydraulic control system of claim 18, further comprising:
a blow-off valve in fluid communication with the default select valve assembly, the blow-off valve being configured to limit line pressure during the plurality of default modes of operation; and
a one-way valve configured to permit a portion of the hydraulic fluid to flow to the second-priority hydraulic circuit when the hydraulic control system is in a default mode of operation of the plurality of default modes of operation.

20. The hydraulic control system of claim 19, wherein the low forward default gear ratio is a second gear ratio and the high forward default gear ratio is a seventh gear ratio, the hydraulic control system being free of an anti-backflow valve in fluid communication with the combined main regulation and priority valve.

* * * * *